US011112933B2

United States Patent
Khandelwal et al.

(10) Patent No.: US 11,112,933 B2
(45) Date of Patent: *Sep. 7, 2021

(54) SYSTEM AND METHOD FOR DISTRIBUTING AN AVATAR

(71) Applicant: AT&T Intellectual Property I, L.P., Atlanta, GA (US)

(72) Inventors: Madhur Khandelwal, Atlanta, GA (US); E-Lee Chang, Mableton, GA (US); Horst Juergen Schroeter, Vero Beach, FL (US); Linda Ann Roberts, Boynton Beach, FL (US); Darnell Clayton, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 361 days.

This patent is subject to a terminal disclaimer.

(21) Appl. No.: 16/039,930

(22) Filed: Jul. 19, 2018

(65) Prior Publication Data

US 2018/0321819 A1    Nov. 8, 2018

Related U.S. Application Data

(63) Continuation of application No. 14/173,585, filed on Feb. 5, 2014, now Pat. No. 10,055,085, which is a
(Continued)

(51) Int. Cl.
*G06F 3/00* (2006.01)
*G06F 3/0481* (2013.01)
(Continued)

(52) U.S. Cl.
CPC .......... *G06F 3/04815* (2013.01); *A63F 13/30* (2014.09); *A63F 13/50* (2014.09);
(Continued)

(58) Field of Classification Search
CPC .... G06F 3/04815; G06F 3/0481; G06F 3/048; A63F 13/30; A63F 13/50; A63F 13/12;
(Continued)

(56) References Cited

U.S. PATENT DOCUMENTS 5,991,373 A    11/1999 Pattison et al.
6,453,294 B1    9/2002 Dutta et al.
(Continued)

OTHER PUBLICATIONS

"Nintendo, Mii Channel", http://web.archive.org/web/20070930024824/ http://www.nintendo.com/consumer/systems/wii/en_na/channelsMii. jsp, Sep. 30, 2007, 1-10.
(Continued)

*Primary Examiner* — Kieu D Vu
*Assistant Examiner* — Andrew Chung
(74) *Attorney, Agent, or Firm* — Guntin & Gust, PLC; Kenneth Kwan

(57) ABSTRACT

A system that incorporates teachings of the present disclosure may include, for example, a first computing device having a controller to present an avatar having characteristics that correlate to a user profile and that conform to operating characteristics of the first computing device, and transmit to a second computing device operational information associated with the avatar for reproducing at least in part the avatar at said second computing device. Other embodiments are disclosed.

20 Claims, 9 Drawing Sheets

Related U.S. Application Data continuation of application No. 12/253,122, filed on Oct. 16, 2008, now Pat. No. 8,683,354.

(51) Int. Cl.

| | |
|---|---|
| *H04N 21/258* | (2011.01) |
| *H04N 21/472* | (2011.01) |
| *H04N 21/643* | (2011.01) |
| *H04L 29/08* | (2006.01) |
| *A63F 13/30* | (2014.01) |
| *A63F 13/50* | (2014.01) |
| *G06F 3/048* | (2013.01) |

(52) U.S. Cl.
CPC ...... *G06F 3/0481* (2013.01); *H04L 29/08072* (2013.01); *H04L 69/329* (2013.01); *H04N 21/25891* (2013.01); *H04N 21/47202* (2013.01); *H04N 21/64322* (2013.01); *G06F 3/048* (2013.01); *H04L 67/306* (2013.01)

(58) Field of Classification Search
CPC ............. H04L 29/08072; H04L 69/329; H04L 67/306; H04N 21/25891; H04N 21/47202; H04N 21/64322
See application file for complete search history.

(56) References Cited

U.S. PATENT DOCUMENTS

| | | | |
|---|---|---|---|
| 6,912,565 B1* | 6/2005 | Powers | A63F 13/12 |
| | | | 709/205 |
| 6,970,177 B2 | 11/2005 | Yamada et al. | |
| 7,085,259 B2 | 8/2006 | Wang et al. | |
| 7,233,988 B2 | 6/2007 | Minakuchi et al. | |
| 7,363,344 B1 | 4/2008 | Coletrane et al. | |
| 7,796,190 B2 | 9/2010 | Basso et al. | |
| 8,149,241 B2 | 4/2012 | Do et al. | |
| 2003/0008713 A1 | 1/2003 | Ushiro et al. | |
| 2003/0120761 A1* | 6/2003 | Patton | H04L 29/08846 |
| | | | 709/222 |
| 2004/0085259 A1* | 5/2004 | Tarlton | H04M 1/72544 |
| | | | 345/2.3 |
| 2004/0095389 A1 | 5/2004 | Sidner | |
| 2004/0221224 A1 | 11/2004 | Blattner et al. | |
| 2005/0118996 A1* | 6/2005 | Lee | G06F 3/011 |
| | | | 455/425 |
| 2005/0190188 A1 | 9/2005 | Anzawa et al. | |
| 2005/0223328 A1 | 10/2005 | Ashtekar | |
| 2006/0015580 A1 | 1/2006 | Gabriel et al. | |
| 2006/0046699 A1 | 3/2006 | Guyot et al. | |
| 2006/0092037 A1 | 5/2006 | Neogi et al. | |
| 2006/0294465 A1 | 12/2006 | Ronen | |
| 2007/0050452 A1* | 3/2007 | Raju | H04L 67/36 |
| | | | 709/204 |
| 2007/0074114 A1 | 3/2007 | Adjali | |
| 2007/0106941 A1 | 5/2007 | Chen et al. | |
| 2007/0260984 A1* | 11/2007 | Marks | A63F 13/79 |
| | | | 715/706 |
| 2007/0299737 A1* | 12/2007 | Plastina | G06Q 30/0207 |
| | | | 705/14.1 |
| 2008/0059578 A1* | 3/2008 | Albertson | G06F 3/017 |
| | | | 709/204 |
| 2008/0141147 A1* | 6/2008 | Buhrke | G06Q 10/10 |
| | | | 715/757 |
| 2008/0146334 A1 | 6/2008 | Kil | |
| 2008/0172635 A1* | 7/2008 | Ross | H04M 1/72544 |
| | | | 715/826 |
| 2008/0215971 A1* | 9/2008 | Gillo | A63F 13/35 |
| | | | 715/706 |
| 2008/0215975 A1 | 9/2008 | Harrison et al. | |
| 2008/0215994 A1 | 9/2008 | Harrison et al. | |
| 2008/0215995 A1 | 9/2008 | Wolf et al. | |
| 2008/0268947 A1* | 10/2008 | Fyock | A63F 13/352 |
| | | | 463/29 |
| 2008/0268956 A1 | 10/2008 | Suzuki | |
| 2008/0306951 A1* | 12/2008 | Rodefer | A63F 13/71 |
| 2009/0044113 A1* | 2/2009 | Jones | G06T 13/40 |
| | | | 715/707 |
| 2009/0099836 A1* | 4/2009 | Jacobsen | G06F 40/58 |
| | | | 704/3 |
| 2009/0138377 A1* | 5/2009 | Oh | G06Q 30/0601 |
| | | | 705/26.1 |
| 2009/0144211 A1* | 6/2009 | O'Sullivan | G06Q 50/01 |
| | | | 706/14 |
| 2009/0158160 A1 | 6/2009 | Alberth, Jr. et al. | |
| 2009/0158170 A1* | 6/2009 | Narayanan | H04L 67/306 |
| | | | 715/753 |
| 2009/0164549 A1* | 6/2009 | Jung | G06F 16/273 |
| | | | 709/201 |
| 2009/0177979 A1* | 7/2009 | Garbow | G06F 21/316 |
| | | | 715/757 |
| 2009/0199095 A1 | 8/2009 | Nicol, II et al. | |
| 2009/0202221 A1 | 8/2009 | Guo et al. | |
| 2009/0241039 A1 | 9/2009 | Estevez et al. | |
| 2009/0259948 A1 | 10/2009 | Hamilton, II et al. | |
| 2009/0259970 A1 | 10/2009 | Hawkins et al. | |
| 2009/0271714 A1 | 10/2009 | Cox et al. | |
| 2009/0282335 A1* | 11/2009 | Alexandersson | H04S 7/30 |
| | | | 715/716 |
| 2009/0300525 A1 | 12/2009 | Jolliff et al. | |
| 2009/0307620 A1 | 12/2009 | Hamilton, II et al. | |
| 2009/0315893 A1 | 12/2009 | Smith et al. | |
| 2009/0318224 A1* | 12/2009 | Ealey | A63F 13/12 |
| | | | 463/31 |
| 2009/0319898 A1 | 12/2009 | Vitorino et al. | |
| 2009/0327219 A1* | 12/2009 | Finn | G06F 16/10 |
| 2009/0328087 A1 | 12/2009 | Higgins et al. | |
| 2010/0036718 A1* | 2/2010 | Hamilton, II | G06Q 30/02 |
| | | | 705/14.4 |
| 2010/0053187 A1* | 3/2010 | Arrasvuori | A63F 13/71 |
| | | | 345/581 |
| 2010/0082567 A1 | 4/2010 | Rosenblatt et al. | |
| 2010/0083148 A1 | 4/2010 | Finn et al. | |
| 2010/0211892 A1 | 8/2010 | Fujioka et al. | |
| 2011/0269540 A1* | 11/2011 | Gillo | A63F 13/35 |
| | | | 463/31 |
| 2012/0071244 A1* | 3/2012 | Gillo | A63F 13/00 |
| | | | 463/42 |
| 2012/0115597 A1* | 5/2012 | Waugaman | A63F 13/31 |
| | | | 463/31 |
| 2014/0223381 A1 | 8/2014 | Huang et al. | |

OTHER PUBLICATIONS

"Youtube, "Apple Futureshock, Knowledge Navigator"", http://www.youtube.com/watch?v=3WdS4Tscwh8, Sep. 18, 2008, 2 pages.

Cosatto, et al., "From Audio-Only to Audio and Video Text-to-Speech", Acta Acustica United with Acustica, vol. 90, Apr. 14, 2004, 1084-1095.

Cosatto, et al., "Lifelike Talking Faces for Interactive Service", Proceedings of the IEEE, vol. 91, No. 9, 2003, 1406-1429.

* cited by examiner

200

SYSTEM AND METHOD FOR DISTRIBUTING AN AVATAR

CROSS-REFERENCE TO RELATED APPLICATIONS

This application is a continuation of U.S. patent application Ser. No. 14/173,585 filed Feb. 5, 2014, which is a continuation of U.S. patent application Ser. No. 12/253,122 filed Oct. 16, 2008, now U.S. Pat. No. 8,683,354, which are all incorporated herein by reference in their entirety.

FIELD OF THE DISCLOSURE

The present disclosure relates generally to avatar presentation techniques and more specifically to a presentation of an avatar in a media communication system.

BACKGROUND

Developments in speech synthesis and computer animation enable the real-time synthesis of faces that look and sound like actual people. With recent advances in speech recognition, natural language interpretation and speech synthesis, conversational interfaces are finding wider acceptance. Collectively, these technologies can be used to produce human-like or animated interactive avatars.

DETAILED DESCRIPTION

One embodiment of the present disclosure can entail a computer-readable storage medium operating in a first computing device having computer instructions for identifying a user profile, determining operating characteristics of the first computing device, presenting an avatar having characteristics that correlate to the user profile and conform to the operating characteristics of the first computing device, detecting a request to transition the avatar to a second computing device, and transmitting to the second computing device information associated with the avatar for reproducing at least in part the avatar at said second computing device.

Another embodiment of the present disclosure can entail a computer-readable storage medium operating in a first computing device having computer instructions for detecting a second computing device presenting a second avatar having characteristics that correlate to a second user profile and that conform to the operating characteristics of the second computing device, receiving from the second computing device operational information associated with the second avatar, and presenting according to the operational information of the second avatar a first avatar having at least in part characteristics of the second avatar.

Yet another embodiment of the present disclosure can entail a first computing device having a controller to present an avatar having characteristics that correlate to a user profile and that conform to operating characteristics of the first computing device, and transmit to a second computing device operational information associated with the avatar for reproducing at least in part the avatar at said second computing device.

Another embodiment of the present disclosure can entail transferring operational characteristics of a first avatar presented by a first computing device to a second computing device responsive to the first computing device detecting a transitional event. The second computing device can present a second avatar having characteristics that correlate at least in part to the operational characteristics of the first avatar.

Figure 1:
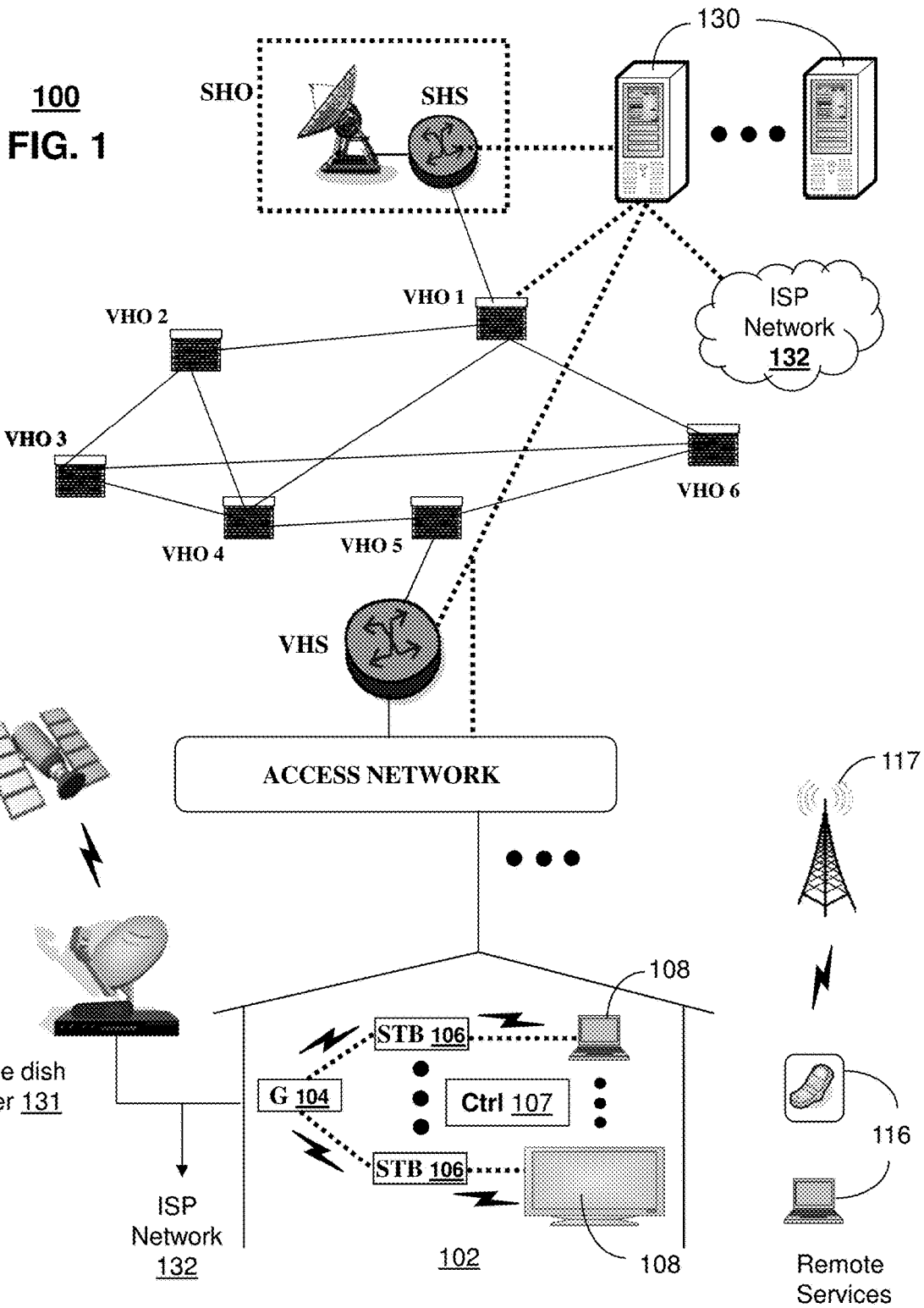
FIGS. 1-4 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via an access network to commercial and/or residential buildings 102 housing a gateway 104 (such as a residential gateway or RG). The access network can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (such as an infrared or RF remote control). Unicast traffic can also be exchanged between the media processors 106 and sub-systems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (such as GSM, CDMA, UMTS, WiMAX, etc.).

Another distinct portion of the one or more computing devices 130 can be used as an avatar engine (herein referred to as an avatar engine 130) for generating and managing interactive avatars which users of the first communication system 100 can be presented for general assistance and presentation of interactive television (iTV) services as well as other services described below. The avatar engine 130 can use common imaging technologies for creating avatars with human-like or animated qualities. The avatar engine 130 can also use common speech recognition and speech synthesis technologies to produce an interactive avatar.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
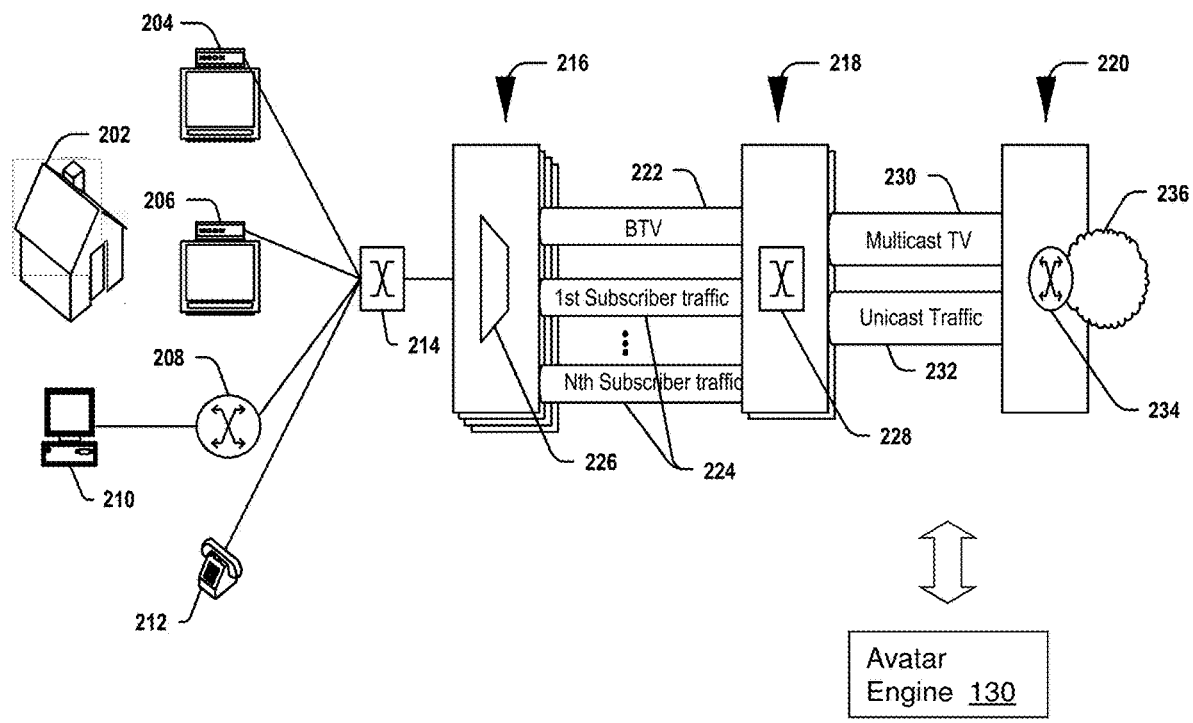

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The avatar engine 130 of FIG. 1 can be operably coupled to the second communication system 200 for purposes similar to those described above.

Figure 3:
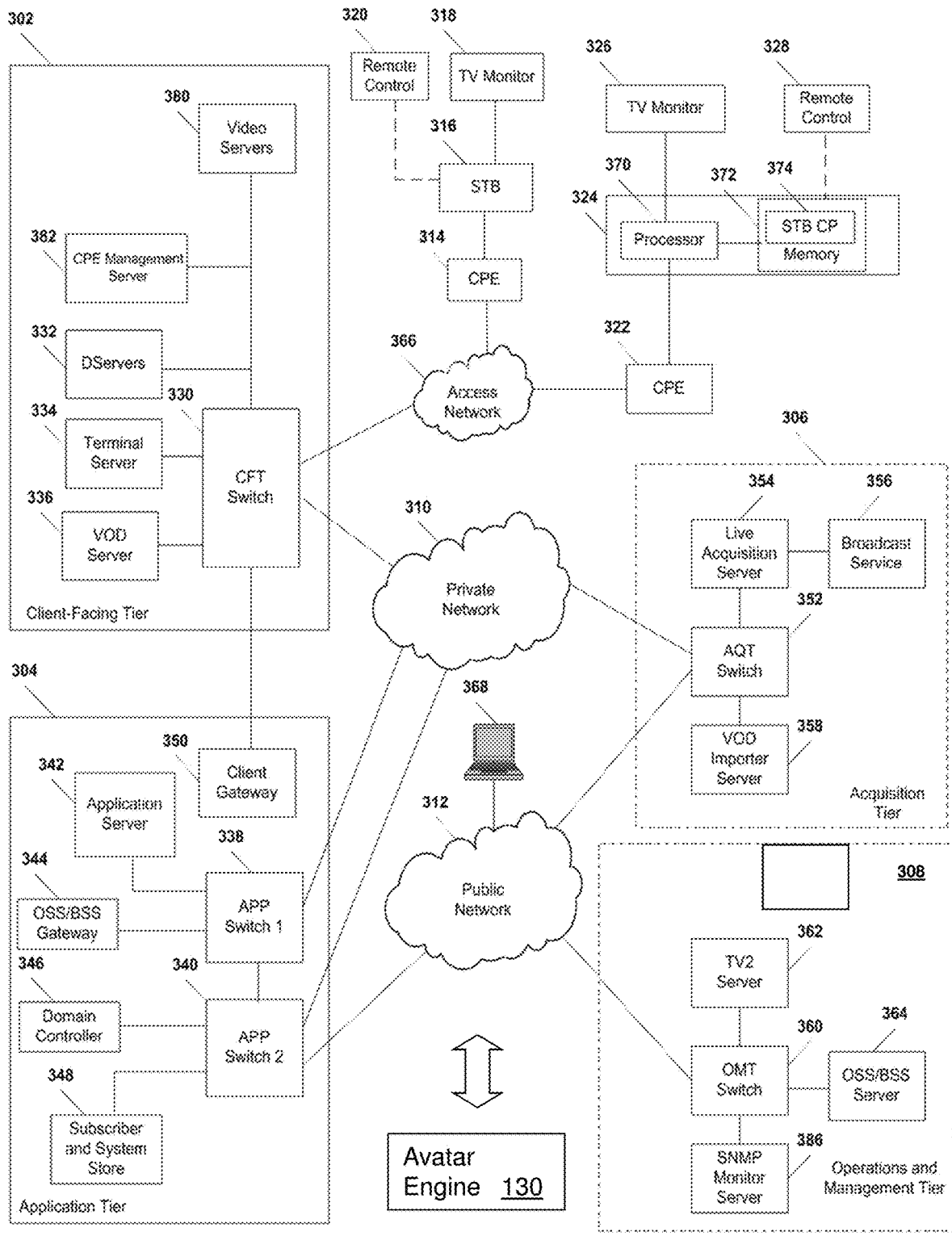

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The avatar engine 130 of FIG. 1 can be operably coupled to the third communication system 300 for purposes similar to those described above.

It should be apparent to one of ordinary skill in the art from the foregoing media communication system embodiments that other suitable media communication systems for distributing broadcast media content as well as peer-to-peer exchange of content can be applied to the present disclosure.

Figure 4:
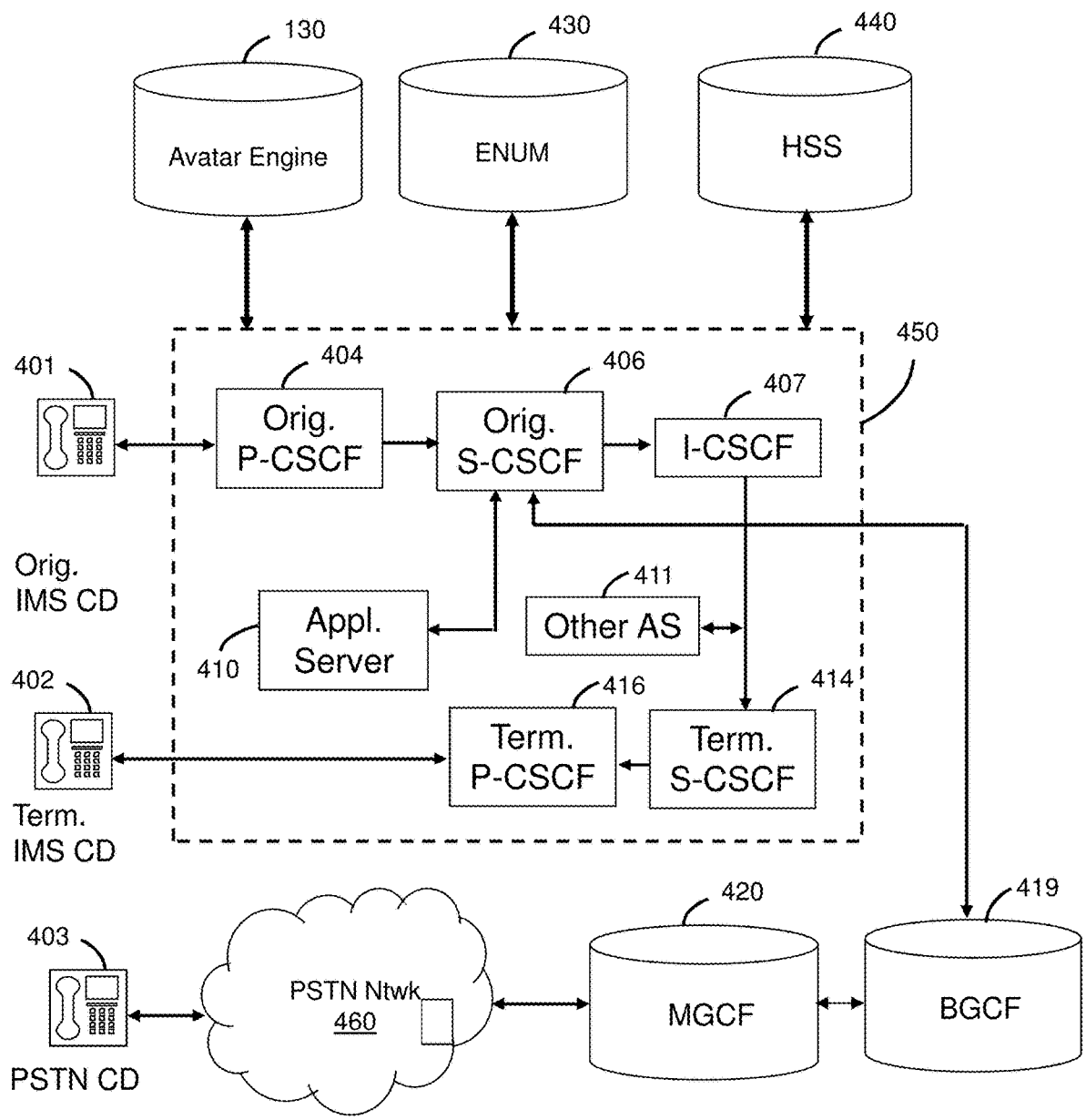

FIG. 4 depicts an illustrative embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (such as *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the avatar engine 130 previously discussed for FIG. 1. In this representative embodiment, the avatar engine 130 can be accessed over a PSTN or VoIP channel of communication system 400 by common techniques such as described above.

Figure 5:
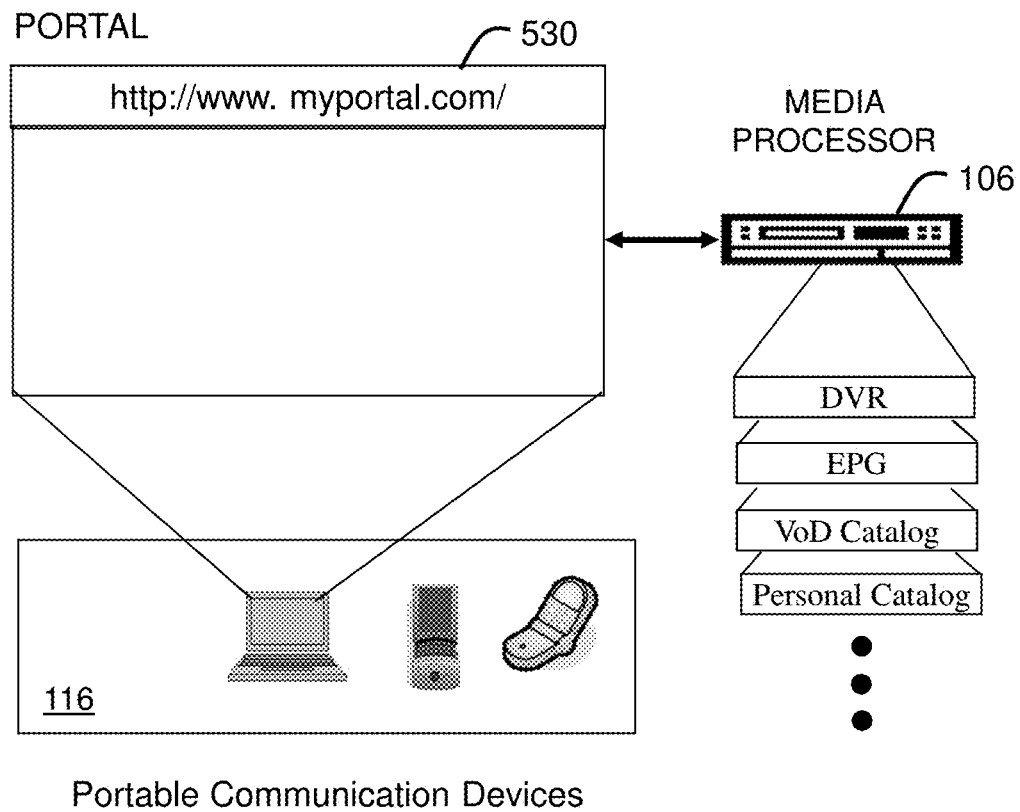
FIG. 5 depicts an illustrative embodiment of a portal interacting with at least one among the communication systems of FIGS. 1-4.

FIG. 5 depicts an illustrative embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog (such as personal videos, pictures, audio recordings, etc.) stored in the STB, a personal computer or server in a user's home or office, and so on.

Figure 6:
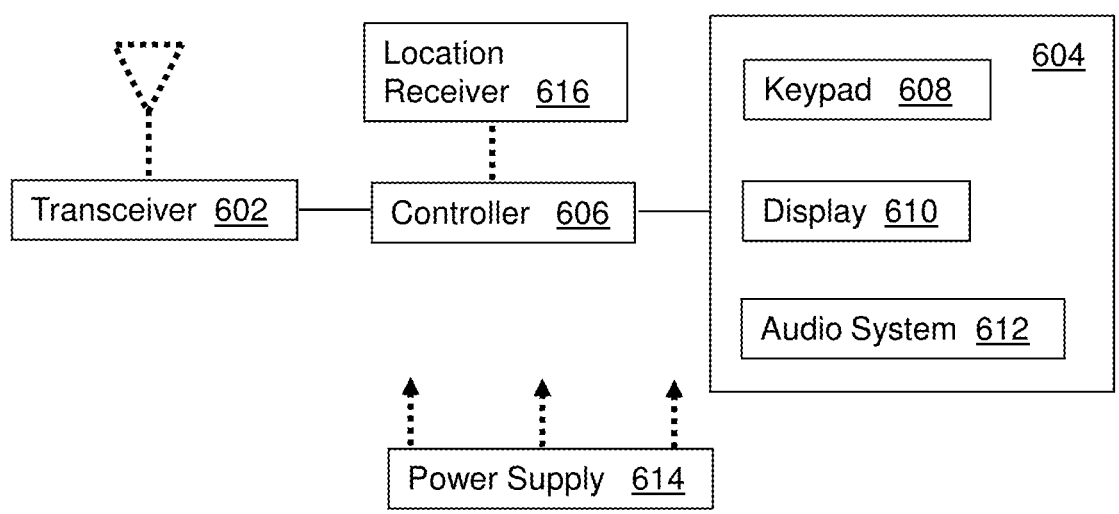
FIG. 6 depicts an illustrative embodiment of a communication device utilized in the communication systems of FIGS. 1-4.

FIG. 6 depicts an exemplary embodiment of a communication device 600. Communication device 600 can be a representative portion of any of the aforementioned communication devices of FIGS. 1-4. The communication device 604 can comprise a wireline and/or wireless transceiver 602 (herein transceiver 602), a user interface (UI) 604, a power supply 614, a location receiver 616, and a controller 606 for managing operations thereof. The transceiver 602 can support short-range or long-range wireless access technologies such as a Bluetooth wireless access protocol, a Wireless Fidelity (WiFi) access protocol, a Digital Enhanced Cordless Telecommunications (DECT) wireless access protocol, cellular, software defined radio (SDR) and/or WiMAX technologies, just to mention a few. Cellular technologies can include, for example, CDMA-1x, UMTS/HSDPA, GSM/GPRS, TDMA/EDGE, EV/DO, and next generation technologies as they arise.

The transceiver 602 can also support common wireline access technologies such as circuit-switched wireline access technologies, packet-switched wireline access technologies, or combinations thereof. PSTN can represent one of the common circuit-switched wireline access technologies. Voice over Internet Protocol (VoIP), and IP data communications can represent some of the commonly available packet-switched wireline access technologies. The transceiver 602 can also be adapted to support IP Multimedia Subsystem (IMS) protocol for interfacing to an IMS network that can combine PSTN and VoIP communication technologies.

The UI 604 can include a depressible or touch-sensitive keypad 608 and a navigation mechanism such as a roller ball, joystick, mouse, and/or navigation disk for manipulating operations of the communication device 600. The keypad 608 can be an integral part of a housing assembly of the communication device 600 or an independent device operably coupled thereto by a tethered wiring interface (such as a USB) or a wireless interface supporting for example Bluetooth. The keypad 608 can represent a numeric dialing keypad commonly used by phones, and/or a Qwerty keypad with alphanumeric keys.

The UI 604 can further include a display 610 such as monochrome or color LCD (Liquid Crystal Display), OLED (Organic Light Emitting Diode) or other suitable display technology for conveying images to the end user of the communication device 600. In an embodiment where the display 610 is touch-sensitive, a portion or all of the keypad 608 can be presented by way of the display. The UI 604 can also include an audio system 612 that utilizes common audio technology for conveying low volume audio (such as audio heard only in the proximity of a human ear) and high volume audio (such as speakerphone for hands free operation). The audio system 612 can further include a microphone for receiving audible signals of an end user.

The power supply 614 can utilize common power management technologies such as replaceable and rechargeable batteries, supply regulation technologies, and charging system technologies for supplying energy to the components of the communication device 600 to facilitate long-range or short-range portable applications. The location receiver 616 utilize common location technology such as a global positioning system (GPS) receiver for identifying a location of the communication device 100, thereby facilitating common location services such as navigation. The controller 606 can utilize computing technologies such as a microprocessor and/or digital signal processor (DSP) with associated storage memory such a Flash, ROM, RAM, SRAM, DRAM or other storage technologies.

Figure 7:
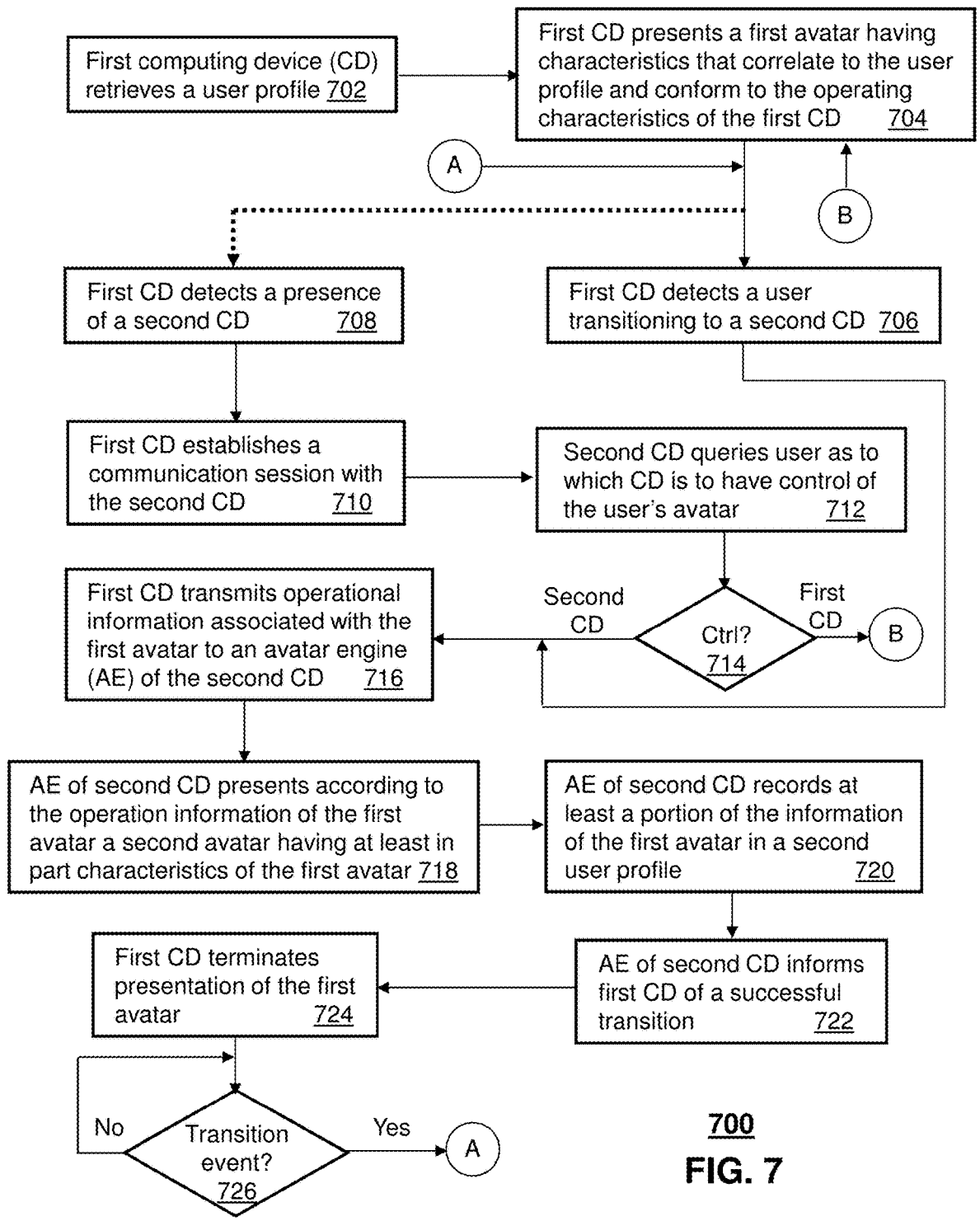
FIG. 7 depicts an illustrative embodiment of a method operating in portions of the communication systems of FIGS. 1-4.
Figure 8:
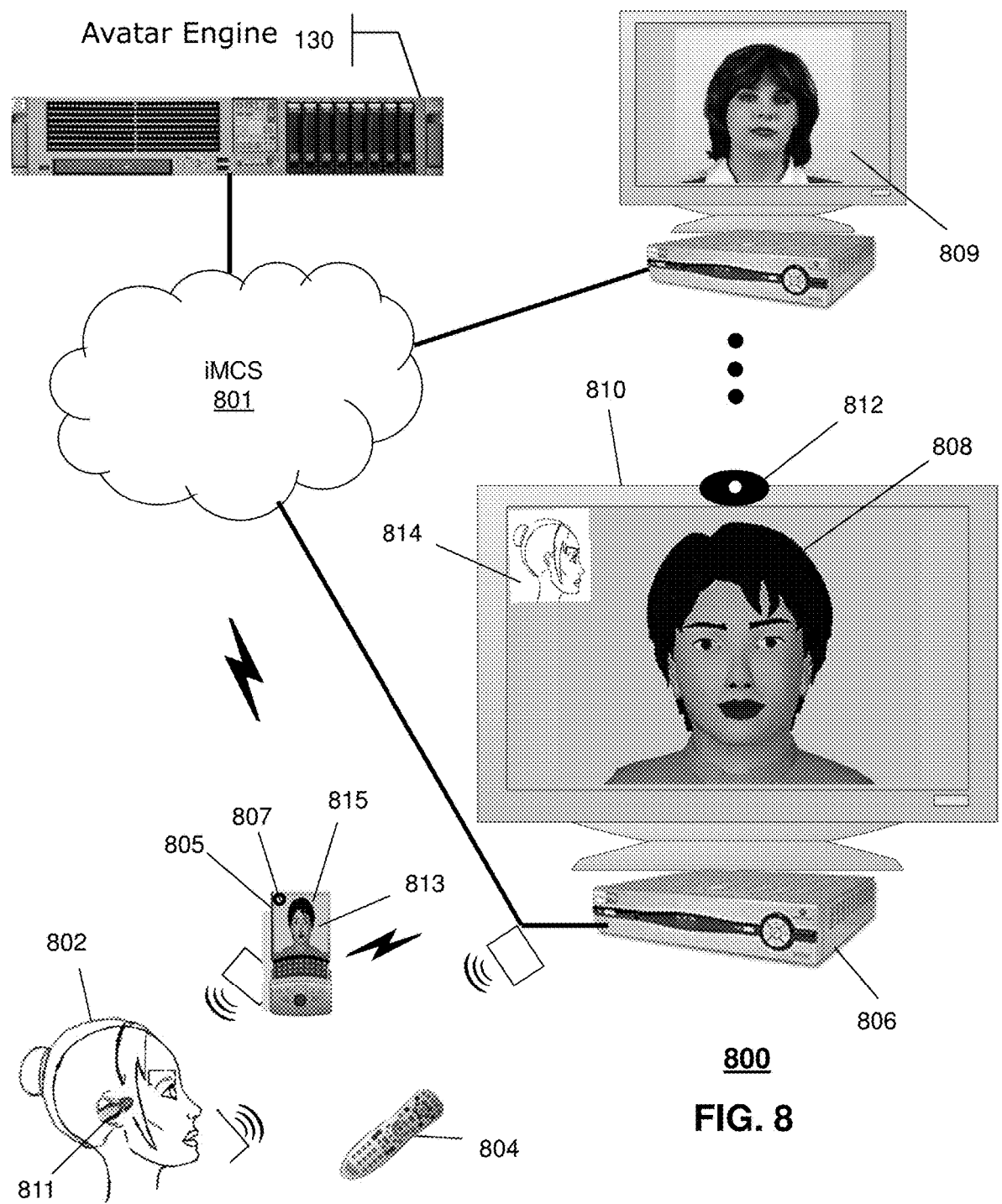
FIG. 8 depicts an illustrative embodiment of a system operating according to the method of FIG. 7.

FIG. 7 depicts an illustrative method 700 operating in portions of communication systems 100-400. FIG. 8 depicts an illustrative embodiment of a system 800 operating according to the method of FIG. 7. FIG. 8 depicts an interactive media communication system 801 such as the systems shown in FIGS. 1-4 (singly or collectively). The interactive media communication system (iMCS) can be coupled to the avatar engine 130 and one or more STBs 806. The STBs 806 are operatively coupled to media presentation devices such as a high-definition television (HDTV) 810 which can present avatar images 808 supplied by the avatar engine 130 by way of the STBs. A user 802 of the STB 806 can interact with the avatar image 808 by speech as well as tactile controls using a remote control 804.

The HDTV 812 can also have a common camera sensor 812 for capturing still and/or moving images of the user 802, which an be displayed in part by the HDTV as a picture-in-picture (PIP) image 814. The visual images of the user can be conveyed to the STB 806. Speech can be detected by a microphone of an audio system of the remote control 804 or an audio system of the STB 806. The avatar image 808 can be an animated image, or can have human-like qualities such as the avatar image 809. The STB 806 can transmit to the avatar engine 130 the visual images as well as speech signals of the user 802 for analysis.

The avatar engine 130 can also be communicatively coupled to a mobile phone 805 for transferring presentation of the avatar 808 to an independently operated avatar engine 813 of the mobile phone. The avatar engine 813 of the mobile phone 805 can have similar functions as the avatar engine 130 of the iMCS 801, but tailored to the computing and presentation resources of the mobile phone. For example, the avatar engine 813 can use speech and/or visual recognition technology to assess responses of the user 802, and speech and image synthesis technology to visually and audibly present the avatar on a display of the mobile phone 805. The mobile phone 805 can have an audio system and camera 807 for detecting audible and visual responses of the user 802. The audio system can also have a loud speaker to convey to the user 802 synthesized speech of the avatar for hands-free operations. To avoid disturbing others, the mobile phone 805 can also incorporate common Bluetooth wireless transceiver technology to communicate with a common Bluetooth headset 811 worn by the user 802.

With system 800 in mind, method 700 can begin with step 702 in which a first computing device such as the avatar engine 130 retrieves a user profile associated with the user 802 of the iMCS 801. This step can be responsive to the user 802 requesting access to the avatar image 808 by initiating a speech command or tactile command (such as selecting an avatar request button on the remote control 804) that is detected by the STB 806, and thereby conveyed to the avatar engine 130.

The user profile can include demographic profiling information of the user 802, psychographic profiling information of the user, and/or user preferences supplied by the user. The demographic profiling information of the user 802 can be based on age, gender, income, number of occupants in household, occupation, education, value of residential property, location of residential property, and/or fees paid for services rendered by the iMCS 801. The demographic profiling information of the user 802 can be determined from a subscriber account of the user and/or monitored media consumption behavior of the user. One or more network elements of the iMCS 801 can utilize common demographic analysis tools to make these determinations.

The psychographic profiling information of the user 802 can also be determined from monitored media consumption behavior of the user and/or subscriber account information. Utilizing common psychographic analysis tools, one or more network elements of the iMCS 801 can generate the psychographic profiling information of the user 802. The psychographic profiling information can identify one or more traits, attitudes, interests, and/or lifestyles of the user 802.

User preferences supplied by the user 802 can identify, for example, a preferred gender for the avatar, a preferred image (could be an image of the user 802, an image of a friend or spouse of the user, celebrity, etc.), a preferred personality for the avatar (mild-mannered avatar), preferred search preferences, preferred content sources, a list of the user's computing devices, user preferences per computing device, and so on.

In step 704 the avatar engine 130 can present on the HDTV 810 the avatar image 808 correlated to the user profile as described above and conforming to the operating characteristics of the resources available to the avatar engine 130 (such as high definition presentation of the avatar by way of the HDTV 810). The avatar engine 130 can use common correlation technology to statistically generate an avatar image that is likely suited for the user 802 according to the previously mentioned aspects provided by the user profile. Using common speech synthesis and recognition technology, the avatar engine 130 can interact with the user 802 to provide interactive media services. Accordingly, the user 802 can initiate speech or tactile responses on the remote control 804 which can be detected by the avatar engine 130 by way of the STB 806.

User responses can represent any detectable visual or audible response of the user 802 monitored by the avatar engine 130 during an exchange between the user and the avatar 808. A response for example can represent a command such as, "Show me my DVR recordings," "Record this program," Show me the EPG for HD channels," Show me the VoD catalog for family movies," "Show me YouTube.com", "Show me contemporary music in iTunes™", "What's the weather like outside?", "What's the weather forecast for the next three days?", "Where can I buy Spencer Tracy movies", "Please interpret the following email written in French", "I am leaving the house now, please transfer to my mobile phone", and so on.

For illustration purposes, assume the avatar engine 130 identifies in step 706 from the user's response a need to transfer presentation control of the avatar 808 between the avatar engine 130 and the avatar engine 813 of a second computing device which in this illustration can be represented by the mobile phone 805. Step 706 can arise from a response of the user 802 such as, "I am leaving the house now, please transfer to my mobile phone". Alternatively, the avatar engine 130 can detect in step 708 a presence of the mobile phone 805 from a wireless communication session established in step 710 between the mobile phone and the iMCS 801 (such as a cellular connection) or between the mobile phone and the STB 806 (such as a WiFi or Bluetooth connection).

The avatar engine 130 can transmit in step 712 through either of these communication sessions a query to the user 802 requesting instructions as to which of the first and second computing devices is to have presentation control of the user's avatar. If the user 802 selects in step 714 the mobile phone 805, the avatar engine 130 proceeds to step 716 where it transmits operational information associated with the avatar 808 to the avatar engine 813 of the mobile phone 805. Otherwise, the avatar engine 130 continues its presentation of the avatar 808 in step 704. Since in step 706 the user 802 expressly stated a desire to transfer the avatar 808 to the mobile phone 805, the avatar engine 130 can bypass the query described in steps 712-714 and begin a transfer of its avatar to the avatar engine 813 of the mobile phone 805 in step 716.

The operational information supplied to the avatar engine 813 of the mobile phone 805 by the avatar engine 130 of the iMCS 801 in step 716 can include computer instructions and/or data for reproducing at least in part characteristics of the avatar 808 at the mobile phone. The characteristics of the avatar 808 that can be reproduced at the mobile phone 805 can include the avatar's physiological appearance, clothing style, speech, gestures, maturity, or knowledge—just to mention a few. The computer instructions can represent artificial intelligence instructions that the avatar engine 813 of the mobile phone 805 can utilize to reproduce at least in part the characteristics of the avatar 808 presented by the avatar engine 130 by way of the STB 806. The data supplied by the avatar engine 130 of the iMCS 801 to the avatar engine 813 of the mobile phone 805 can include for example information relating to the user's profile such as newly updated demographic or psychographic information that can inform the avatar engine 813 of the user's most recent interests and behaviors, newly updated preferences supplied by the user 802, and so on.

Since the presentation and computing resources available to the avatar engine 130 (such as the STB 806 and the HDTV 810) can be substantially different from the presentation and computing resources of the mobile phone 805, the characteristics of the avatar 808 generated by the avatar engine 130 of the iMCS 801 can differ from the characteristics of the avatar 815 generated by the avatar engine 813 of the mobile phone. Accordingly, the avatar engine 813 of the mobile phone 805 can in step 718 present according to the operational information supplied by the avatar engine 130 of the iMCS 801 and the limited presentation and computing resources of the mobile phone characteristics of an avatar 815 that correlate in whole or in part to the characteristics of the avatar 808. Thus a comparison of the physiological appearance, speech patterns, gestures, knowledge or other aspects of the avatar 815 can show in some instances an exact replica between the avatars 815 and 808 (same appearance, speech pattern, and gestures) and in other instances similarities falling short of a replica between said avatars (lower display resolution on the mobile phone, limited knowledge resources available on the mobile phone for assisting the user, and so on).

To achieve a certain level of synchronicity between the avatar engine 130 of the iMCS 801 and the avatar engine 813 of the mobile phone 805, the avatar engine 813 of the mobile phone can record in step 720 at least a portion of the operational information supplied by the avatar engine 130. In this step, the avatar engine 813 of the mobile phone 805 can also record any adaptation procedure that may have been necessary to accommodate the presentation of the avatar 815. The adaptation procedure can describe for example the display resolution used for presenting the avatar 815 on the display of the mobile phone 805, speech and visual synthesis parameters used for presenting the avatar 815, camera settings used to capture the user's image to determine therefrom the user's reactions, and so on.

To prevent a duplicate presentation of avatars, the avatar engine 813 of the mobile phone 805 can also inform the avatar engine 130 of the iMCS 801 in step 722 when the transition (or receipt of the operational information) has succeeded. In response the avatar engine 130 of the iMCS 801 can terminate in step 724 presentation of the avatar 808 at the STB 806. The steps leading up to step 724 can provide the user 802 an experience in which the transfer of the avatar 808 generated by the avatar engine 130 of the iMCS 801 to the avatar 815 generated by the avatar engine 813 of the mobile phone 805 can appear to be seamless. Thus to the user 802 the avatar can appear to travel with the user 802 from computing device to computing device with limited effort or complexity.

In step 726 each of the avatar engines 130 and 813 can monitor whether a transition event has occurred which would require a virtual transfer of the user's avatar between computing devices such as for example a transfer of presentation control of the avatar from the avatar engine 813 of the mobile phone 805 back to the avatar engine 130 of the iMCS 801. If the avatar engine 813 of the mobile phone 805 detects a transition event such as an express request by the user 802 or a detection of a presence of another computing device with an avatar engine, the avatar engine 813 of the mobile phone can proceed to one of steps 706-708 to initiate a transfer to the other computing device in a manner similar to what has been described.

Upon reviewing the aforementioned embodiments, it would be evident to an artisan with ordinary skill in the art that said embodiments can be modified, reduced, or enhanced without departing from the scope and spirit of the claims described below. For example, method 700 can be adapted so that each of the computing devices of the user 802 (desktop computer, laptop computer, office computer, IMS phone, VoIP phone, home appliances, STBs, DVR, media player, etc.) can be a target device taking control of an incarnation or version of the user's avatar. Transfers can take place between computing devices with like resources (mobile phone to mobile phone) and computing devices with dissimilar resources (STB to mobile phone, mobile phone to STB, avatar engine 130 of iMCS 801 to STB, and so on). Accordingly, the user 802 can seamlessly transition its avatar between computing devices as described earlier with the characteristics of the avatar of the originating computing device replicated in whole or in part by the avatar engine of a recipient computing device.

Additionally, method 700 can be adapted so that the operational information supplied to a recipient computing device can include an avatar engine in instances where the recipient computing device does not already have an available avatar engine. The operational information in this instance can represent artificial intelligence or computer instructions that collectively form an avatar engine that can perform speech recognition, image recognition, speech synthesis, and image synthesis.

Also, depending on the presentation resources of the recipient computing device, method 700 can be adapted to present characteristics of the avatar not previously available at the originating computing device. For example a recipient computing device (such as a gaming console) with tactile presentation resources such as haptics (force feedback, heat generation, and so on) can utilize these resources to enhance the experience of the user's exchange with the avatar.

Other suitable modifications can be applied to the present disclosure without departing from the scope of the claims below. Accordingly, the reader is directed to the claims section for a fuller understanding of the breadth and scope of the present disclosure.

Figure 9:
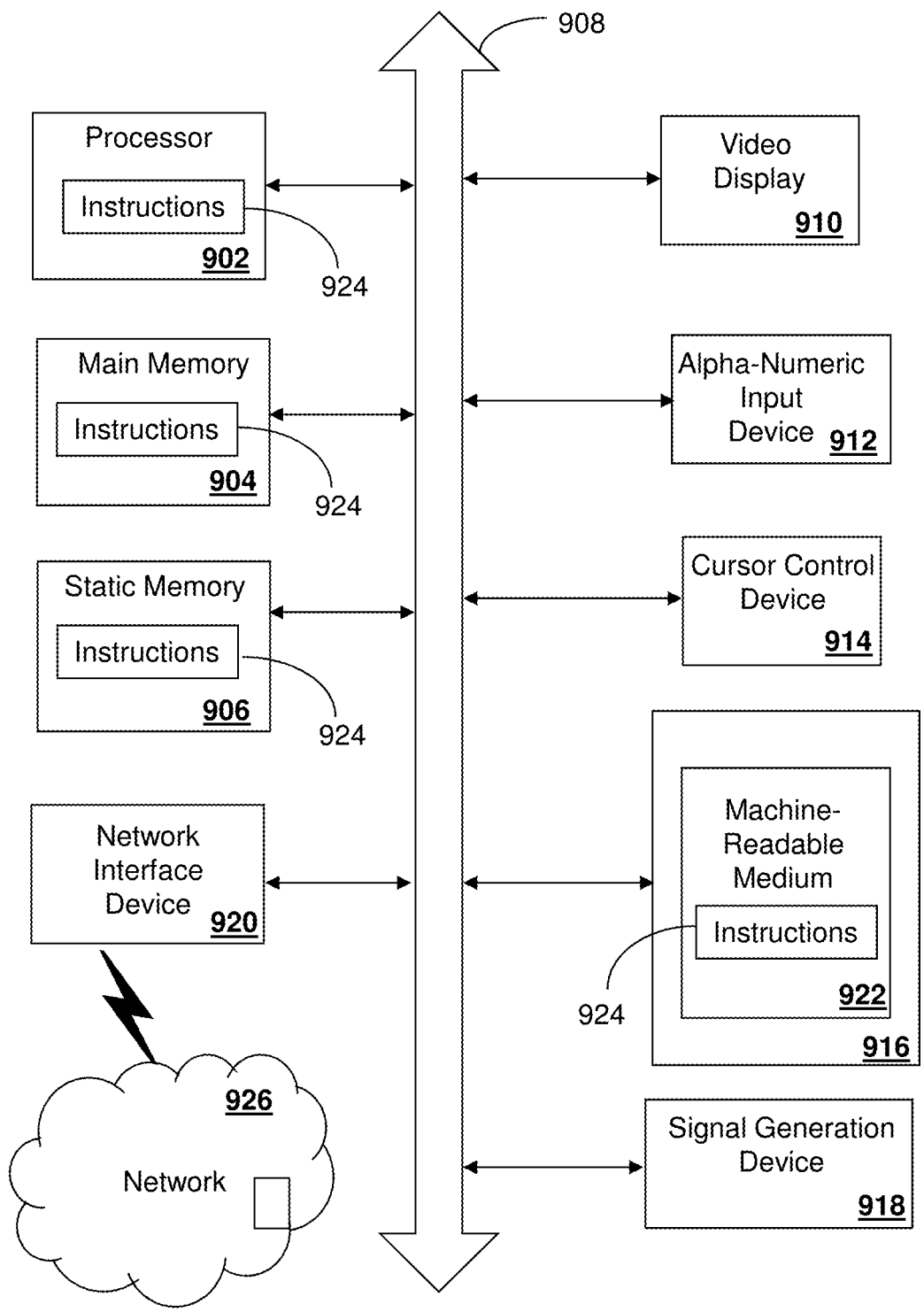
FIG. 9 is a diagrammatic representation of a machine in the form of a computer system within which a set of instructions, when executed, may cause the machine to perform any one or more of the methodologies discussed herein.

FIG. 9 depicts an exemplary diagrammatic representation of a machine in the form of a computer system 900 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, a solid state display, or a cathode ray tube (CRT)). The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a machine-readable medium 922 on which is stored one or more sets of instructions (e.g., software 924) embodying any one or more of the methodologies or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, comprising:
detecting a first computing device that is presenting a first avatar having characteristics that correlate to a user profile on a first communication network, wherein the first computing device provides first audio content associated with the first avatar via a speaker associated with the first computing device;
determining, based on receiving a command from a user input indicating that a user is departing a premises in which the first computing device is located and that avatar presentation control is to be transferred to a second computing device, to transfer the avatar presentation control from the first computing device to the second computing device;
transmitting, from the first computing device to the second computing device over a second communication network, operational information associated with the first avatar, based on the determining to transfer the avatar presentation control from the first computing device to the second computing device;
detecting a presentation of a second avatar on the second computing device, wherein the second computing device generates the second avatar at the second computing device, and wherein generating of the second avatar by the second computing device includes adapting the characteristics of the first avatar by the second computing device using presentation resources of the second computing device such that one or more different characteristics, that are not available and not presented for the first avatar at the first computing device, are presented for the second avatar on the second computing device to enhance exchanges between the user and the second avatar on the second computing device, wherein the presentation resources include haptics presentation resources that relate to force feedback, heat generation, or a combination thereof, and wherein the presentation of the second avatar is such that other characteristics of the first avatar relating to appearance, speech pattern, or gesture are presented differently due to lower display resolution of the second computing device or limited knowledge resources available on the second computing device;
providing control of the second avatar to the second computing device, wherein the second computing device detects a user headset via a peer-to-peer wireless communication network, and wherein the second computing device provides second audio content associated with the second avatar to the user headset via the peer-to-peer wireless communication network; and
in response to providing control of the second avatar to the second computing device, terminating presentation of the first avatar on the first computing device.

2. The device of claim 1, wherein the second computing device comprises a gaming console.

3. The device of claim 1, wherein the user input comprises a user-generated voice input.

4. The device of claim 1, wherein the first communication network comprises a local wireless communication network and the second communication network comprises a cellular communication network.

5. The device of claim 4, wherein the peer-to-peer wireless communication network operates based on a short-range wireless technology standard.

6. The device of claim 1, wherein the first computing device is one of a desktop computer, laptop computer, office computer, IMS phone, VoIP phone, home appliance, set top box, digital video recorder, media player, or mobile phone, and wherein the second computing device is one of a desktop computer, laptop computer, office computer, IMS phone, VoIP phone, home appliance, set top box, digital video recorder, media player, or mobile phone.

7. The device of claim 1, wherein the generating of the second avatar by the second computing device comprises the second computing device generating the second avatar according to the operational information and the presentation resources of the second computing device.

8. A non-transitory computer-readable storage device, comprising executable instructions which when executed by a processing system including a processor, facilitate performance of operations comprising:

detecting a first computing device that is presenting a first avatar having characteristics that correlate to a user profile on a first communication network, wherein the first computing device provides first audio content associated with the first avatar via a speaker associated with the first computing device;

receiving user-generated voice input;

determining, based on the user-generated voice input indicating that a user is departing a premises in which the first computing device is located and that avatar presentation control is to be transferred to a second computing device, to transfer the avatar presentation control from the first computing device to the second computing device;

transmitting, from the first computing device to the second computing device over a second communication network, operational information associated with the first avatar, based on the determining to transfer the avatar presentation control from the first computing device to the second computing device;

detecting a presentation of a second avatar on the second computing device, wherein the second computing device generates the presentation of the second avatar at the second computing device, and wherein generating of the second avatar by the second computing device includes adapting the characteristics of the first avatar by the second computing device using presentation resources of the second computing device such that one or more different characteristics, that are not available and not presented for the first avatar at the first computing device, are presented for the second avatar on the second computing device to enhance exchanges between the user and the second avatar on the second computing device, wherein the presentation resources include haptics presentation resources that relate to force feedback, heat generation, or a combination thereof, and wherein the presentation of the second avatar is such that other characteristics of the first avatar relating to appearance, speech pattern, or gesture are presented differently due to lower display resolution of the second computing device or limited knowledge resources available on the second computing device;

providing control of the second avatar to the second computing device, wherein the second computing device detects a user headset via a peer-to-peer wireless communication network, and wherein the second computing device provides second audio content associated with the second avatar to the user headset via the peer-to-peer wireless communication network; and in response to providing control of the second avatar to the second computing device, terminating presentation of the first avatar on the first computing device.

9. The non-transitory computer-readable storage device of claim 8, wherein the second computing device comprises a gaming console.

10. The non-transitory computer-readable storage device of claim 8, wherein the first communication network comprises a local wireless communication network and the second communication network comprises a cellular communication network.

11. The non-transitory computer-readable storage device of claim 8, wherein the first computing device is one of a desktop computer, laptop computer, office computer, IMS phone, VoIP phone, home appliance, set top box, digital video recorder, media player, or mobile phone, and wherein the second computing device is one of a desktop computer, laptop computer, office computer, IMS phone, VoIP phone, home appliance, set top box, digital video recorder, media player, or mobile phone.

12. The non-transitory computer-readable storage device of claim 8, wherein the operational information associated with the first avatar relates to physiological appearance, clothing style, speech, gesture, maturity, knowledge, or a combination thereof.

13. The non-transitory computer-readable storage device of claim 12, wherein the generating of the second avatar by the second computing device comprises the second computing device generating the second avatar according to the operational information and the presentation resources of the second computing device.

14. A method, comprising:

detecting, by a processing system including a processor, a first computing device that is presenting a first avatar having characteristics that correlate to a user profile on a first communication network, wherein the first computing device provides first audio content associated with the first avatar via a speaker associated with the first computing device;

determining, by the processing system, and based on receiving a command from a user input indicating that a user is departing a premises in which the first computing device is located and that avatar presentation control is to be transferred to a second computing device, to transfer the avatar presentation control from the first computing device to the second computing device;

transmitting, by the processing system, operational information associated with the first avatar from the first computing device to the second computing device over a second communication network;

detecting, by the processing system, a presentation of a second avatar on the second computing device, wherein the second computing device generates the presentation of the second avatar at the second computing device, and wherein generating of the second avatar by the second computing device includes adapting the characteristics of the first avatar by the second computing device according to the operational information using presentation resources of the second computing device such that one or more different characteristics, that are not available and not presented for the first avatar at the first computing device, are presented for the second avatar on the second computing device to enhance exchanges between the user and the second avatar on the second computing device, wherein the presentation resources include haptics presentation resources that relate to force feedback, heat generation, or a combination thereof, and wherein the presentation of the second avatar is such that other characteristics of the first avatar relating to appearance, speech pattern, or gesture are presented differently due to lower display resolution of the second computing device or limited knowledge resources available on the second computing device;

providing, by the processing system, control of the second avatar to the second computing device, wherein the second computing device detects a user headset via a peer-to-peer wireless communication network, and wherein the second computing device provides second audio content associated with the second avatar to the user headset via the peer-to-peer wireless communication network; and in response to providing control of the second avatar to the second computing device, terminating, by the processing system, presentation of the first avatar on the first computing device.

15. The method of claim 14, wherein the second computing device comprises a gaming console.

16. The method of claim 14, wherein the user input comprises a user-generated voice input.

17. The method of claim 14, wherein the operational information associated with the first avatar relates to physiological appearance, clothing style, speech, gesture, maturity, knowledge, or a combination thereof.

18. The method of claim 14, wherein the first communication network comprises a local wireless communication network and the second communication network comprises a cellular communication network.

19. The method of claim 18, wherein the peer-to-peer wireless communication network operates based on a short-range wireless technology standard.

20. The method of claim 14, wherein the first computing device is one of a desktop computer, laptop computer, office computer, IMS phone, VoIP phone, home appliance, set top box, digital video recorder, media player, or mobile phone, and wherein the second computing device is one of a desktop computer, laptop computer, office computer, IMS phone, VoIP phone, home appliance, set top box, digital video recorder, media player, or mobile phone.

* * * * *